United States Patent
Luccato

(10) Patent No.: US 10,770,980 B2
(45) Date of Patent: Sep. 8, 2020

(54) ELECTRONIC CONVERTER AND RELATED METHOD OF OPERATING AN ELECTRONIC CONVERTER

(71) Applicant: OSRAM GmbH, Munich (DE)

(72) Inventor: Daniele Luccato, Vittorio Veneto (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/766,026

(22) PCT Filed: Oct. 4, 2016

(86) PCT No.: PCT/IB2016/055923
§ 371 (c)(1),
(2) Date: Apr. 5, 2018

(87) PCT Pub. No.: WO2017/060813
PCT Pub. Date: Apr. 13, 2017

(65) Prior Publication Data
US 2019/0115843 A1    Apr. 18, 2019

(30) Foreign Application Priority Data
Oct. 6, 2015   (IT) .......................... 102015000058562

(51) Int. Cl.
*H02M 3/335* (2006.01)
*H02M 1/14* (2006.01)
(Continued)

(52) U.S. Cl.
CPC ......... *H02M 3/33592* (2013.01); *H02M 1/08* (2013.01); *H02M 1/14* (2013.01);
(Continued)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS

2013/0336016 A1* 12/2013 Shiji ................. H02M 3/33507
363/21.02
2014/0009971 A1* 1/2014 Itou .................... H02M 3/33507
363/21.01

(Continued)

FOREIGN PATENT DOCUMENTS

| EP | 2107674 A1 | 10/2009 |
| WO | 2006038157 A2 | 4/2006 |
| WO | 2015044846 A2 | 4/2015 |

OTHER PUBLICATIONS

International Search Report based on application No. PCT/IB2016/055923 (12 pages) dated Jan. 25, 2017 (for reference purpose only).

*Primary Examiner* — Bryan R Perez
(74) *Attorney, Agent, or Firm* — Viering, Jentschura & Partner MBB

(57) ABSTRACT

An electronic half-bridge converter includes an input comprising two terminals for receiving a first power signal, and an output comprising two terminals for providing a second power signal.
The converter includes a transformer and a half-bridge, wherein the half-bridge is interposed between input and primary winding of transformer.
On the secondary side of transformer, the converter includes a rectifier circuit configured for converting the current provided via secondary winding into a rectified current, and a filter circuit configured for providing said second power signal by means of a filtering of the rectified current provided by rectifier circuit.
The filter circuit includes:
   a first branch connected between both input terminals of the filter circuit and comprising a first inductor and a first capacitor connected in series, and
(Continued)

a second branch connected in parallel with the first branch and comprising a second inductor and the output connected in series.

20 Claims, 13 Drawing Sheets

(51) Int. Cl.
*H05B 45/37* (2020.01)
*H02M 1/08* (2006.01)

(52) U.S. Cl.
CPC ......... *H02M 3/335* (2013.01); *H02M 3/3353* (2013.01); *H05B 45/37* (2020.01); *Y02B 20/348* (2013.01)

(58) Field of Classification Search
CPC ......... H02M 3/33507; H02M 3/33592; H02M 3/33523; H02M 3/3353; H02M 3/33569; H02M 2007/4818; H02M 2007/4815; H02M 2007/4811
See application file for complete search history.

(56) References Cited

U.S. PATENT DOCUMENTS

| | | | |
|---|---|---|---|
| 2014/0146573 A1* | 5/2014 | Yan | H02M 3/3376 363/17 |
| 2014/0312789 A1* | 10/2014 | Feng | H02M 3/33507 315/186 |
| 2015/0062971 A1 | 3/2015 | Ye et al. | |
| 2015/0163882 A1* | 6/2015 | Zhang | H05B 33/0821 372/38.01 |
| 2015/0280588 A1* | 10/2015 | Marrero | H02M 3/33546 363/21.04 |

* cited by examiner

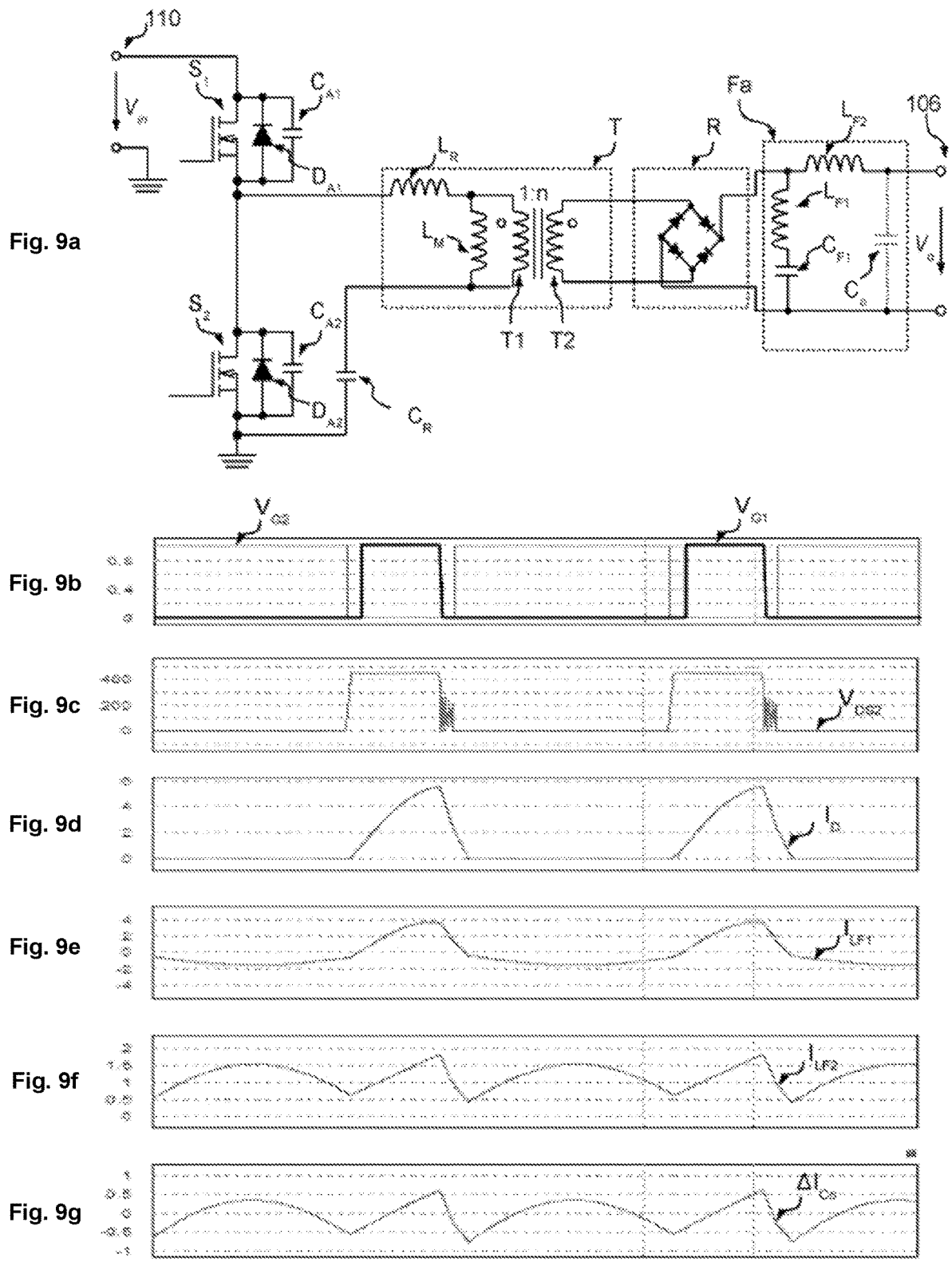

US 10,770,980 B2

1

ELECTRONIC CONVERTER AND RELATED METHOD OF OPERATING AN ELECTRONIC CONVERTER

RELATED APPLICATIONS

The present application is a national stage entry according to 35 U.S.C. § 371 of PCT application No.: PCT/IB2016/055923 filed on Oct. 4, 2016, which claims priority from Italian Application No.: 102015000058562 filed on Oct. 6, 2015, and is incorporated herein by reference in its entirety.

FIELD OF THE INVENTION

Various embodiments relate to electronic converters.

DESCRIPTION OF THE RELATED ART

Electronic converters for light sources comprising e.g. at least one LED (Light Emitting Diode) or other solid-state lighting means, may offer a direct current output. Such current may be steady or vary in time, e.g. in order to adjust the brightness emitted by the light source (so-called dimming function).

FIG. 1 shows a possible lighting arrangement comprising an electronic converter 10 and a lighting module 20 including, e.g., at least one LED L.

For instance, FIG. 2 shows an example of a lighting module 20 comprising e.g. a LED chain, i.e. a plurality of LEDs connected in series. As an example, FIG. 2 shows four LEDs $L_1$, $L_2$, $L_3$ and $L_4$.

Electronic converter 10 usually comprises a control circuit 102 and a power circuit 12 (e.g. an AC/DC or DC/DC switching supply) which receives at an input a power signal (e.g. from the mains) and provides at an output, via a power output 106, a direct current. Such a current may be steady or vary in time. E.g., control circuit 102 may set, via a reference channel $I_{ref}$ of power circuit 12, the current required by LED module 20.

For example, such a reference channel $I_{ref}$ may be used for adjusting the brightness of the light emitted by lighting module 20. As a matter of fact, in general terms, a regulation of the light brightness emitted by LED module 20 may be achieved by regulating the average current flowing through the lighting module, for example by setting a lower reference current $I_{ref}$ or by switching on or off power circuit 12 through a Pulse Width Modulation (PWM) signal.

Generally speaking, there are known many types of electronic converters, which are mainly divided into insulated and non-insulated converters. For example, among the non-insulated electronic converters we may name "buck", "boost", "buck-boost", "Cuk", "SEPIC" and "ZETA" converters. Insulated converters are e.g. "flyback", "forward" converters. Such converter arrangements are well known to the person skilled in the art.

For example, FIG. 3 shows a circuit diagram of an insulated half-bridge converter 12 operating as a DC/DC converter. The person skilled in the art will appreciate that an input AC current may be converted into a direct current via a rectifier, e.g. a diode-bridge rectifier, and optionally a filter capacitor.

In the presently considered example, converter 12 receives at input, via two input terminals 110/GND, a voltage $V_{in}$ and provides at output, via two output terminals 106, a regulated voltage $V_o$ or a regulated current $i_o$.

2

In the presently considered example, a load $R_O$ is connected with said output 106, and it may consist in the previously described lighting module 20.

Converter 12 moreover includes a half-bridge, i.e. two electronic switches $S_1$ and $S_2$ which are connected in series between both input terminals 110/GND, wherein the switching of electronic switches $S_1$ and $S_2$ is driven by a control unit 112. For example, in the embodiment such electronic switches $S_1$ and $S_2$ are N-MOS transistors, in particular n-channel MOSFETs (Metal-Oxide-Semiconductor Field-Effect Transistors). Such switches $S_1$ and $S_2$ may have respective capacitances $C_{A1}$, $C_{A2}$ and respective diodes $D_{A1}$, $D_{A2}$ connected therewith in parallel.

Typically, control unit 112 is configured for switching switches $S_1$ and $S_2$ alternatively, i.e. only one of both switches $S_1$ and $S_2$ is closed at a given time. Generally speaking, there may be also provided intermediate intervals during which neither switch $S_1$ or $S_2$ is closed.

In the presently considered example, converter 12 moreover comprises a transformer T including a primary winding T1 and a secondary winding T2. Specifically, transformer T may be modelled as an ideal transformer having a given ratio of the number of turns 1:n, an inductor $L_M$ which represents the magnetising induction of transformer T, and an inductor $L_R$ which represents the leakage inductance, which are shown in FIG. 3 on the primary side of transformer T.

In the presently considered example, primary winding T1 of transformer T and at least one capacitor $C_R$ are connected in series between the intermediate point between both switches $S_1$ and $S_2$ and the first input terminal 110 (positive terminal) and/or the second input terminal GND (a negative terminal representing a first ground). Specifically, in the presently considered example, the first terminal of primary winding T1 of transformer T is connected (e.g. directly) at the intermediate point between both electronic switches $S_1$ and $S_2$. On the other hand, the second terminal of primary winding T1 of transformer T is connected, via at least one capacitor $C_R$, to the first input terminal 110 and/or to ground GND. Therefore, switches $S_1$ and $S_2$ may be used for selectively connecting the first terminal of primary winding T1 of transformer T to voltage $V_{in}$ or to ground GND, thereby controlling the current flowing through primary winding T1 of transformer T.

On the secondary side T2 of transformer T, converter 12 comprises a rectifier circuit R configured for converting the alternated current (AC) provided by secondary winding T2 into a direct current (DC), and a filter circuit stabilizing the signal provided by rectifier circuit R, so that output voltage $V_o$ and/or output current $i_o$ are more stable.

In this regard, FIGS. 4a to 4d show some possible examples of half-bridge converters.

Specifically, FIG. 4a shows a traditional half-bridge converter.

On the primary side, a first terminal of primary winding T1 is connected directly to the intermediate point of the half-bridge, and the second terminal of primary winding T1 is connected, via a capacitor $C_R$, to ground GND (and optionally, through a further capacitor $C_R$, to the positive input terminal).

On the other hand, on the secondary side T2, half-bridge converter 12 typically comprises a diode-bridge rectifier as a rectifier circuit R. The filter circuit F is typically implemented as in a forward converter, with an inductor L and a capacitor $C_o$. Specifically, inductor L is connected between the positive output terminal of diode bridge R and the positive terminal of capacitor $C_o$, and the negative terminal of capacitor $C_o$ is connected to the negative output terminal of diode bridge R. Finally, output 106 is connected in parallel with capacitor $C_o$.

FIG. 4*b* shows an alternative implementation of half-bridge converter 12, wherein secondary winding T2 comprises an intermediate connection, i.e. a so-called tab, which substantially corresponds to two secondary windings which are connected in series. In this case, rectifier circuit R may be implemented only with two diodes $D_1$ and $D_2$. Specifically, the anode of the first diode $D_1$ is connected to the first terminal of secondary winding T2, and the cathode is connected to the positive terminal of filter circuit F, e.g. inductor L. Similarly, the anode of the second diode $D_2$ is connected to the second terminal of secondary winding T2, and the cathode is connected to the positive terminal of filter circuit F. Finally, the intermediate connection point of secondary winding T2 is connected to the negative terminal of filter circuit F, e.g. the negative terminal of capacitor C.

FIG. 4*c* shows an example of converter 12, wherein only one of the half-waves is transferred from secondary winding T2 to filter circuit F.

For example, this may be obtained by using only one of the branches of the secondary winding shown in FIG. 4*b*. For example, in FIG. 4*c*, rectifier circuit R comprises a single diode D, wherein the anode of diode D is connected to a first terminal of secondary winding T2, the cathode of diode D is connected to the positive terminal of filter circuit F and a second terminal of secondary winding T2 is connected to the negative terminal of filter circuit F.

Moreover, FIG. 4*c* shows that filter circuit F may comprise only one capacitor $C_o$, which is connected between the terminals of filter circuit F. Also in this case, output 106 is connected in parallel with the output of filter circuit F, i.e. in parallel with capacitor $C_o$.

Finally, FIG. 4*d* shows a resonant half-bridge converter LLC. For example, such a converter is described in document EP 2107674, the content whereof is included herein by way of reference.

In this document, the first terminal of primary winding T1 is connected via a capacitor $C_R$ to the intermediate point of the half-bridge, and the second terminal of primary winding T1 is connected to ground GND.

In this case, too, there is provided a rectifier circuit R and a filter circuit F.

For example, typically the rectifier circuit R has the same structure as the rectifier circuit R which is used in a half-bridge converter as shown in FIG. 4*a* or 4*b*. For example, in document EP 2107674 a secondary winding T2 is employed having an intermediate connection and two diodes $D_1/D_2$. Finally, in the simplest case, the filter circuit comprises only one capacitor $C_o$.

Therefore, in the embodiments described in the foregoing, rectifier circuit R provides current pulses which are sent to filter circuit F, which uses the current provided by rectifier circuit R for charging an output capacitor $C_o$.

Generally speaking, the output capacitor $C_o$, connected in parallel with output 106, is purely optional. As a matter of fact, such a capacitor $C_o$ is adapted to be used, for example, in the presence of a resistive load, in order to keep output voltage $V_o$ substantially constant. On the contrary, if the load is a LED module 20 comprising a LED chain (see for example FIG. 2), output voltage $V_o$ is constrained by the LED voltage itself, and therefore capacitor $C_o$ may also be omitted, especially for LEDs having low dynamic resistance.

The person skilled in the art will appreciate that the half-bridge converter 12 shown in FIG. 4*c* will exhibit a high ripple in the output signal. As a matter of fact, in this topology only one of the half-waves of the oscillations of secondary winding T2 is transferred to filter circuit F. Moreover, an LC filter as used in FIGS. 4*a* and 4*b* is often adapted to stabilize the output current better than a single capacitor (having the same size). Therefore, in the past it was also proposed to provide an additional LC filter to the electronic converter, e.g. by turning a C filter into a CLC filter, which also enables a size reduction of output capacitor $C_o$.

SUMMARY

The present description aims at providing solutions for the filter circuit of an electronic converter, enabling the reduction of ripple in the output current. Such a filter is particularly useful for converters used for driving LEDs, or generally for converters with current control.

According to various embodiments, said object is achieved thanks to an electronic converter having the features set forth in the claims that follow. The embodiments also refer to a related method of operating an electronic half-bridge converter.

The claims are an integral part of the technical teaching provided herein with reference to the disclosure.

As previously stated, the present description relates to an electronic converter comprising a new filter circuit.

In various embodiments, the electronic converter comprises an input to receive a first power signal and an output to provide a second power signal. The converter comprises a transformer having a primary winding and a secondary winding, and a half-bridge interposed between the input and the primary winding of the transformer.

In various embodiments, the converter moreover comprises a rectifier circuit, adapted to convert the current provided through the secondary winding of the transformer into a rectified current, and a filter circuit configured for filtering such a rectified current.

For example, as described in the foregoing, the rectifying circuit may comprise a single diode connected in series with the secondary winding of the transformer. Alternatively, the rectifier circuit may comprise a diode bridge. Finally, if the secondary winding comprises an intermediate connection point, such an intermediate connection point may be connected to the negative input terminal of the filter circuit, and the other two terminals of the secondary winding may be connected through respective diodes to the positive input terminal of the filter circuit.

In various embodiments, the filter circuit comprises two input terminals for receiving the rectified current. A first branch is connected between said two input terminals, wherein said first branch comprises a first inductor and a first capacitor connected in series. A second branch is connected in parallel with the first branch, wherein said second branch comprises a second inductor and the output of the converter connected in series.

In various embodiments, the filter circuit may comprise a second capacitor connected in parallel with the output of the converter.

BRIEF DESCRIPTION OF THE DRAWINGS

Embodiments will now be described, by way of non-limiting example only, with reference to the annexed views.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIGS. 9a and 9g show a second embodiment of an electronic converter comprising the filter circuit according to the present description.

DETAILED DESCRIPTION OF EMBODIMENTS

In the following description, numerous specific details are given to provide a thorough understanding of the embodiments. The embodiments can be practiced without one or more of the specific details, or with other methods, components, materials, etc. In other instances, well-known structures, materials, or operations are not shown or described in detail to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only and therefore do not interpret the extent of protection or scope of the embodiments.

In the following FIGS. 5 to 10b, the parts, elements or components which have already been described with reference to FIGS. 1 to 4d are denoted with the same references previously used in such Figures; the description of such previously described elements will not be repeated in the following, so as not to overburden the present detailed description.

As mentioned in the foregoing, the present description provides solutions adapted to implement filter circuits for electronic converters comprising a half-bridge $S_1/S_2$, a transformer T, a rectifier circuit R and a filter circuit Fa.

Figure 5:
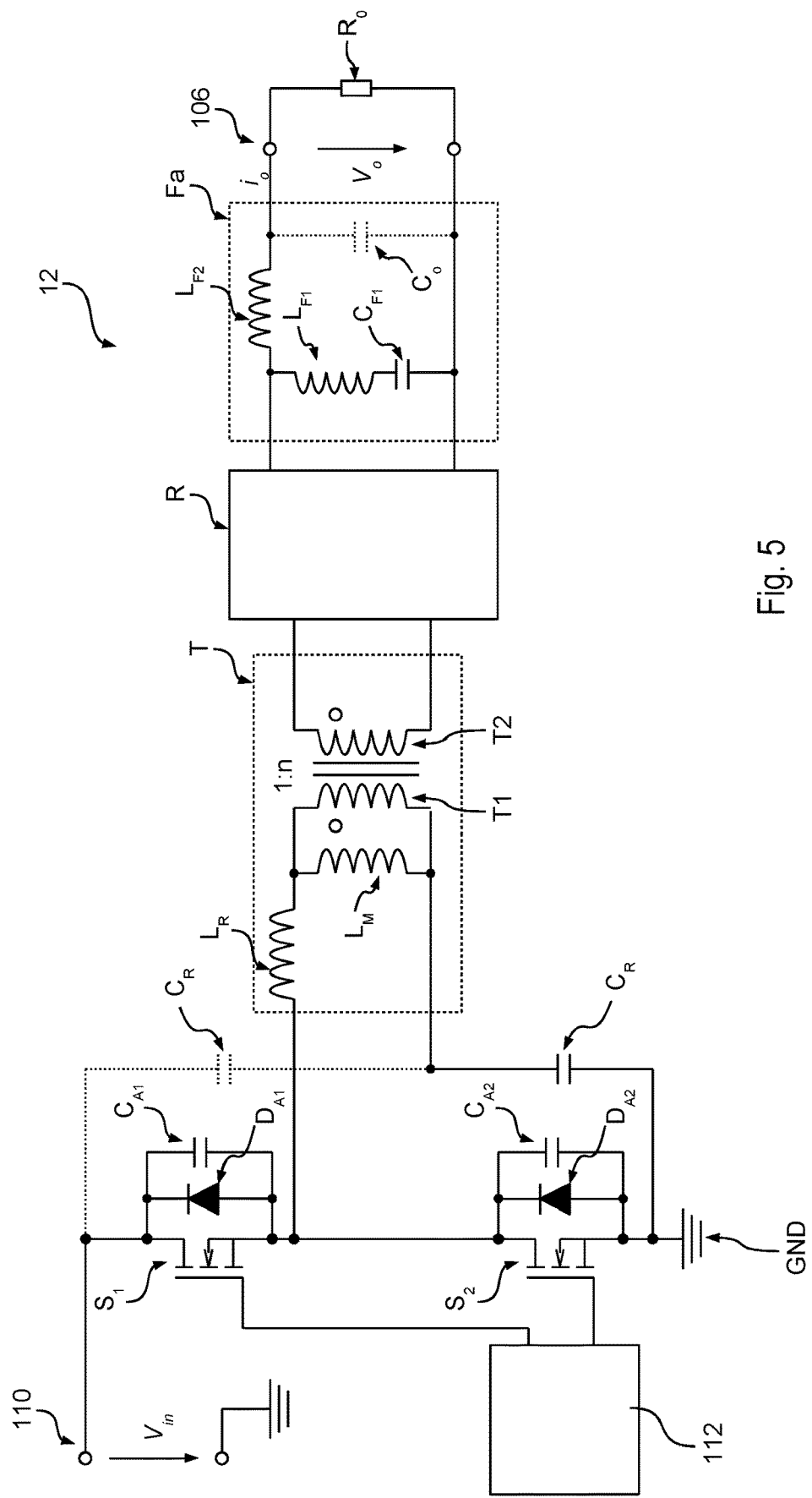
FIG. 5 shows an electronic converter comprising a filter circuit according to the present description.

FIG. 5 shows a first embodiment of an electronic converter according to the present description.

In this case, as well, converter 12 receives at input, via two input terminals 110/GND, a voltage $V_{in}$, and provides at output, via two output terminals 106, a regulated voltage $V_o$ or preferably a regulated current $i_o$.

Figure 1:
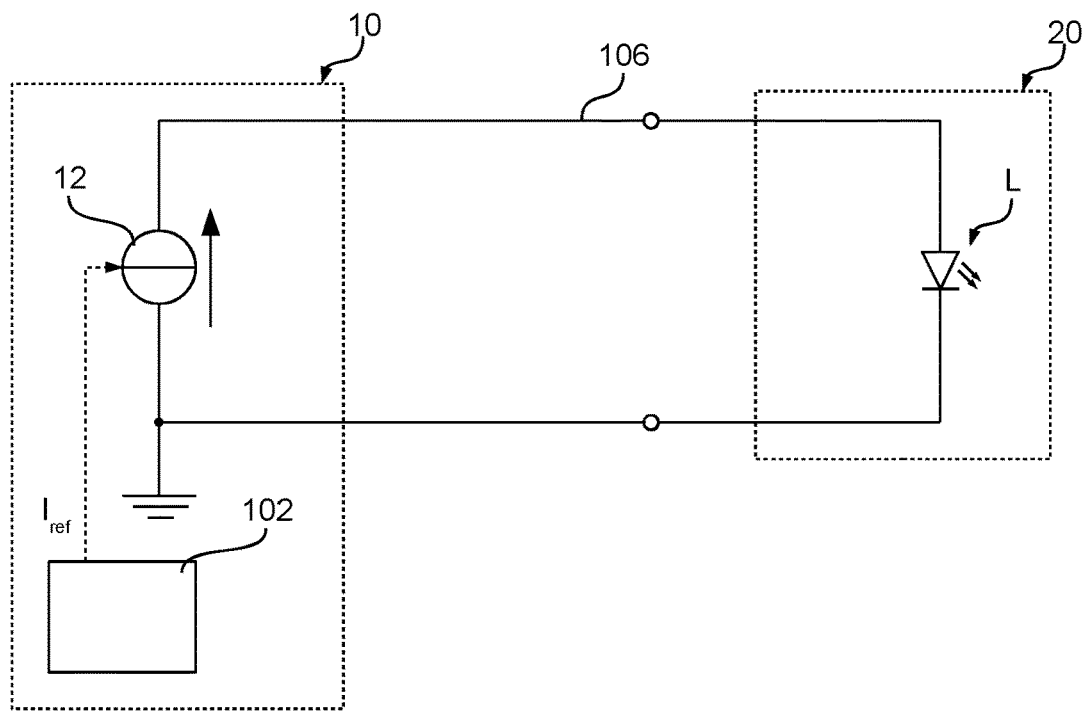
FIGS. 1 to 4d have already been described in the foregoing.
Figure 2:
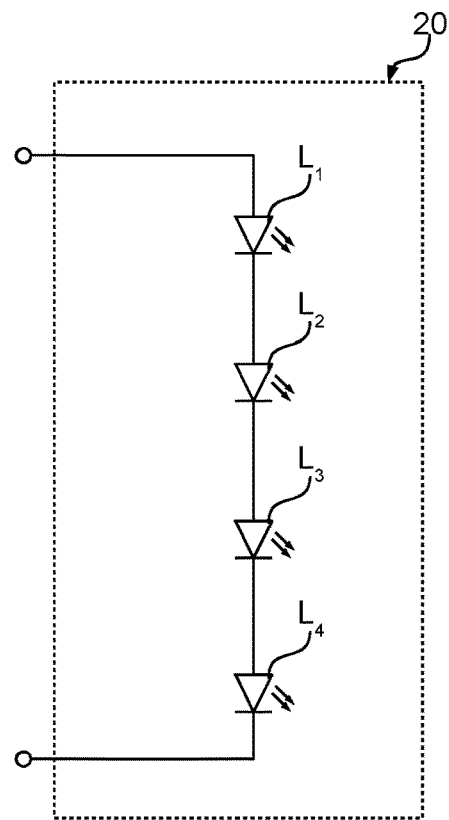
Figure 3:
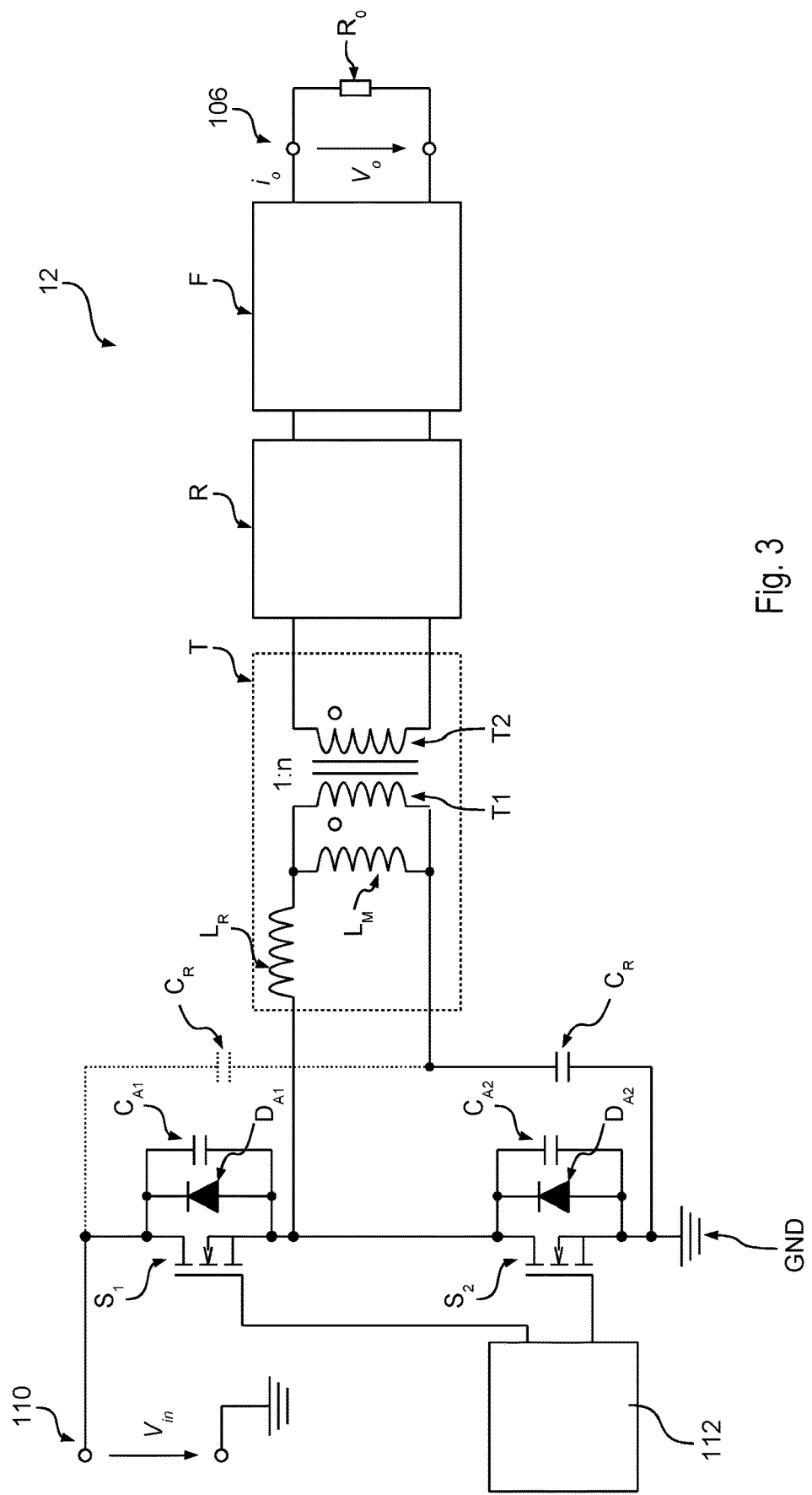

In the presently considered embodiment, a load $R_0$ is connected to said output 106, which may be e.g. the lighting module 20 described with reference to FIGS. 1 and 2.

Converter 12 moreover comprises a half-bridge, i.e. two electronic switches $S_1$ and $S_2$ which are connected in series between both input terminals 110, wherein the switching of electronic switches $S_1$ and $S_2$ is driven by a control unit 112.

For example, control unit 112 may be an analogue and/or a digital circuit, e.g. a micro-processor which is programmed via a software code. For example, in various embodiments, control unit 112 is configured for driving switches as a function of output current $i_o$, e.g. in order to regulate output current $i_o$ to a desired (average) value.

In various embodiments, electronic switches $S_1$ and $S_2$ are N-MOS transistors, in particular n-channel MOSFETs (Metal-Oxide-Semiconductor Field-Effect Transistors). Such switches $S_1$ and $S_2$ may have respective capacitances $C_{A1}$, $C_{A2}$ and respective diodes $D_{A1}$, $D_{A2}$ connected in parallel therewith. For example, capacitances $C_{A1}$ and $C_{A2}$ may represent the intrinsic capacitances of a MOSFET, and/or may be implemented via additional capacitors, which are connected in parallel with switches $S_1$ and $S_2$. On the other hand, diodes $D_{A1}$ and $D_{A2}$ may represent the body diodes of a MOSFET, and/or may be implemented via additional diodes.

In the presently considered embodiment, converter 12 moreover comprises a transformer T, including a primary winding T1 and a secondary winding T2. Specifically, transformer T may be modelled as an ideal transformer having a given ratio of the number of turns 1:n, an inductor $L_M$ which represents the magnetising induction of transformer T and an inductor $L_R$ which represents the leakage inductance, which are mounted on the primary side of transformer T. Generally speaking, converter 12 may also comprise other inductors, which are connected in series and/or in parallel with primary winding T1 and/or secondary winding T2 of transformer T.

Specifically, primary winding T1 of transformer T and at least one capacitor $C_R$ are connected in series between the intermediate point between both electronic switches $S_1$ and $S_2$ and the first input terminal and/or the second input terminal, which represents a first ground GND. Specifically, in the presently considered embodiment, the first terminal of primary winding T1 of transformer T is connected (e.g. directly) to the intermediate point between both electronic switches $S_1$ and $S_2$. On the contrary, the second terminal of primary winding T1 of transformer T is connected through at least one capacitor $C_R$ to the first input terminal and/or to ground GND. Therefore, switches $S_1$ and $S_2$ may be used for selectively connecting the first terminal of primary winding T1 of transformer T to voltage $V_{in}$ or to ground GND.

On the secondary side T2 of transformer T, the converter comprises a rectifier circuit R, configured for converting the alternated current AC provided by secondary winding T2 into a direct current, and a filter circuit Fa which stabilizes the signal provided by rectifier circuit R so that output voltage $V_o$ and/or output current $i_o$ are more stable. Accordingly, in the embodiment considered, rectifier circuit R and filter circuit Fa are connected between the secondary winding T2 of the transformer and the output 106 of the electronic converter.

Specifically, in various embodiments, the previously described filter circuits F, which are comprised of a C, LC or CLC structure, are replaced by a new filter circuit Fa comprising two LC filters connected in parallel.

Specifically, as shown in FIG. 5, the filter circuit Fa according to the present description comprises two input terminals and two output terminals. Both input terminals are connected to the upstream rectifier circuit R of converter 12, and the output terminals represent the output 106 of converter 12. Accordingly, in the embodiment considered, filter circuit Fa is connected between the output of the rectifier circuit R and the output 106 of the electronic converter.

Specifically, between both input terminals of filter circuit Fa there are connected two branches respectively comprising a capacitor and an inductor, i.e. a first capacitor $C_{F1}$ and a first inductor $L_{F1}$ are connected (e.g. directly) in series between the input terminals of filter circuit Fa, and a second capacitor $C_o$ and a second inductor $L_{F2}$ are connected (e.g. directly) in series between the input terminals of filter circuit Fa. For example, in the presently considered embodiment, inductors $L_{F1}$ and $L_{F2}$ are connected directly to the positive output terminal of rectifier circuit R, and capacitors $C_{F1}$ and $C_o$ are connected directly to the negative output terminal of rectifier circuit R. Moreover, the output of filter circuit Fa is connected in parallel with the second capacitor $C_o$, i.e. the terminals of capacitor $C_o$ represent the output terminals 106 of converter 12, which may be used e.g. for supplying a LED lighting module 20.

In this case, as well, output capacitor $C_o$ connected in parallel with output 106 is purely optional, because if the load is a LED module 20 comprising a LED chain, output voltage $V_o$ is already constrained by the LED voltage itself, and therefore capacitor $C_o$ may be omitted.

Therefore, generally speaking, the first capacitor $C_{F1}$ and the first inductor $L_{F1}$ are connected (e.g. directly) in series between both input terminals of filter circuit Fa, and the second inductor $L_{F2}$ and output 106 are connected (e.g. directly) in series between both input terminals of filter circuit Fa, wherein an optional output capacitor $C_o$ may be connected in parallel with output 106.

As stated in the foregoing, the circuit described with reference to FIG. 4c typically has a higher ripple, and therefore it will be considered first.

Figure 6:
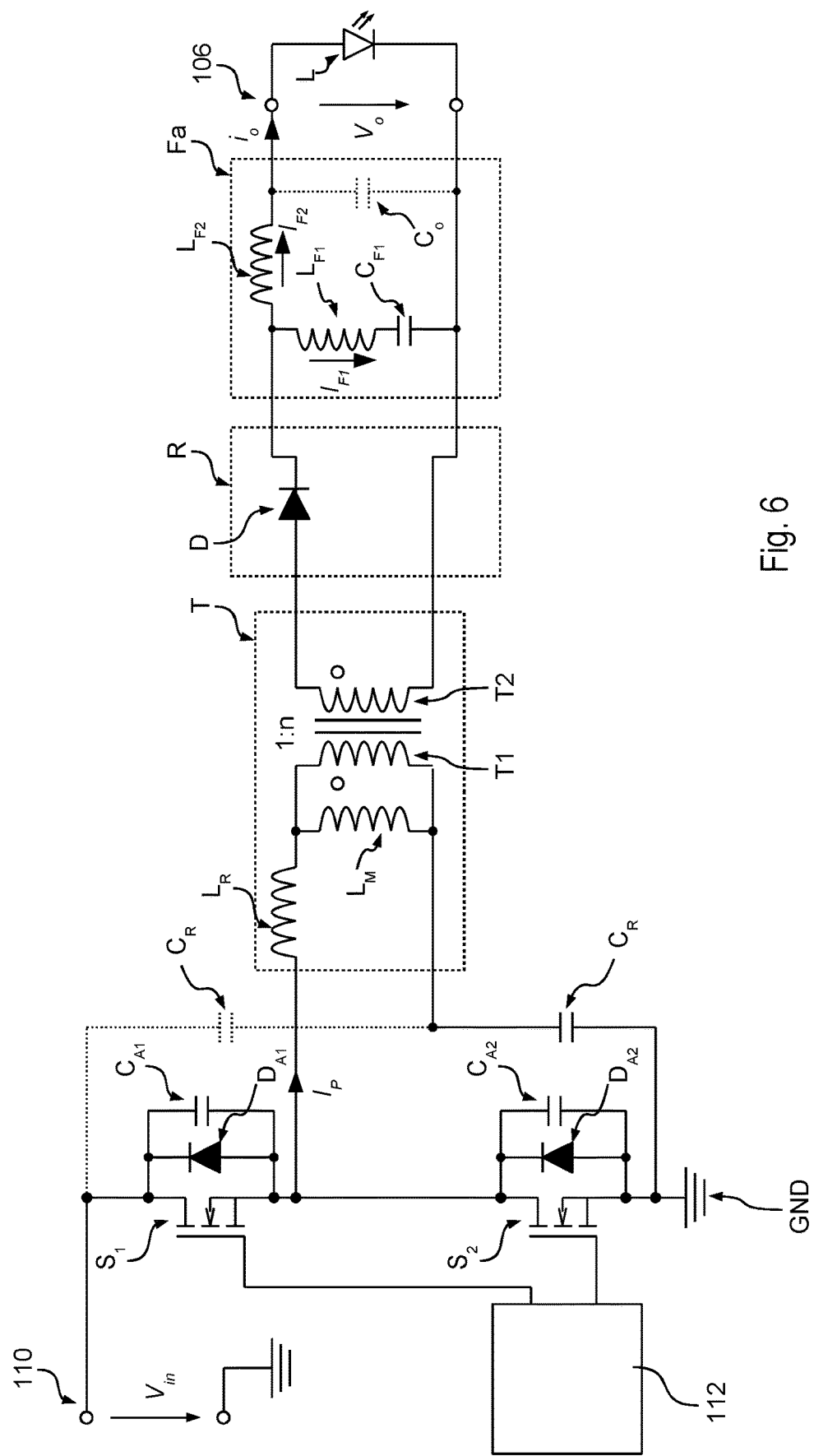
FIG. 6 shows an embodiment of an electronic converter comprising the filter circuit according to the present description.

In this regard, FIG. 6 shows a corresponding embodiment of a half-bridge converter 12 employing a filter circuit Fa according to the present description.

In the presently considered embodiment, the converter comprises, on the secondary side of transformer T, a rectifier circuit R comprising a single diode D and the filter circuit Fa shown in FIG. 5.

Therefore, in the presently considered embodiment, the anode of diode D is connected to a first terminal of secondary winding T2, the cathode of diode D is connected (preferably directly) to the positive input terminal of filter circuit Fa, and the second terminal of secondary winding T2 (which represents the negative terminal of rectifier circuit R) is connected to the negative input terminal of filter circuit Fa.

In the following there will be described a possible operation of the electronic converter of FIG. 6.

Specifically, in the presently considered embodiment, control unit 112 is configured for driving switches $S_1$ and $S_2$ of the half-bridge with the following phases, which are repeated periodically:

during a first time interval $\Delta t1$ switch $S_1$ is closed and switch $S_2$ is opened;

during a second time interval $\Delta t2$ switch $S_1$ is opened and switch $S_2$ is opened;

during a third time interval $\Delta t3$ switch $S_1$ is opened and switch $S_2$ is closed;

during a fourth time interval $\Delta t4$ switch $S_1$ is opened and switch $S_2$ is opened.

Figure 7:
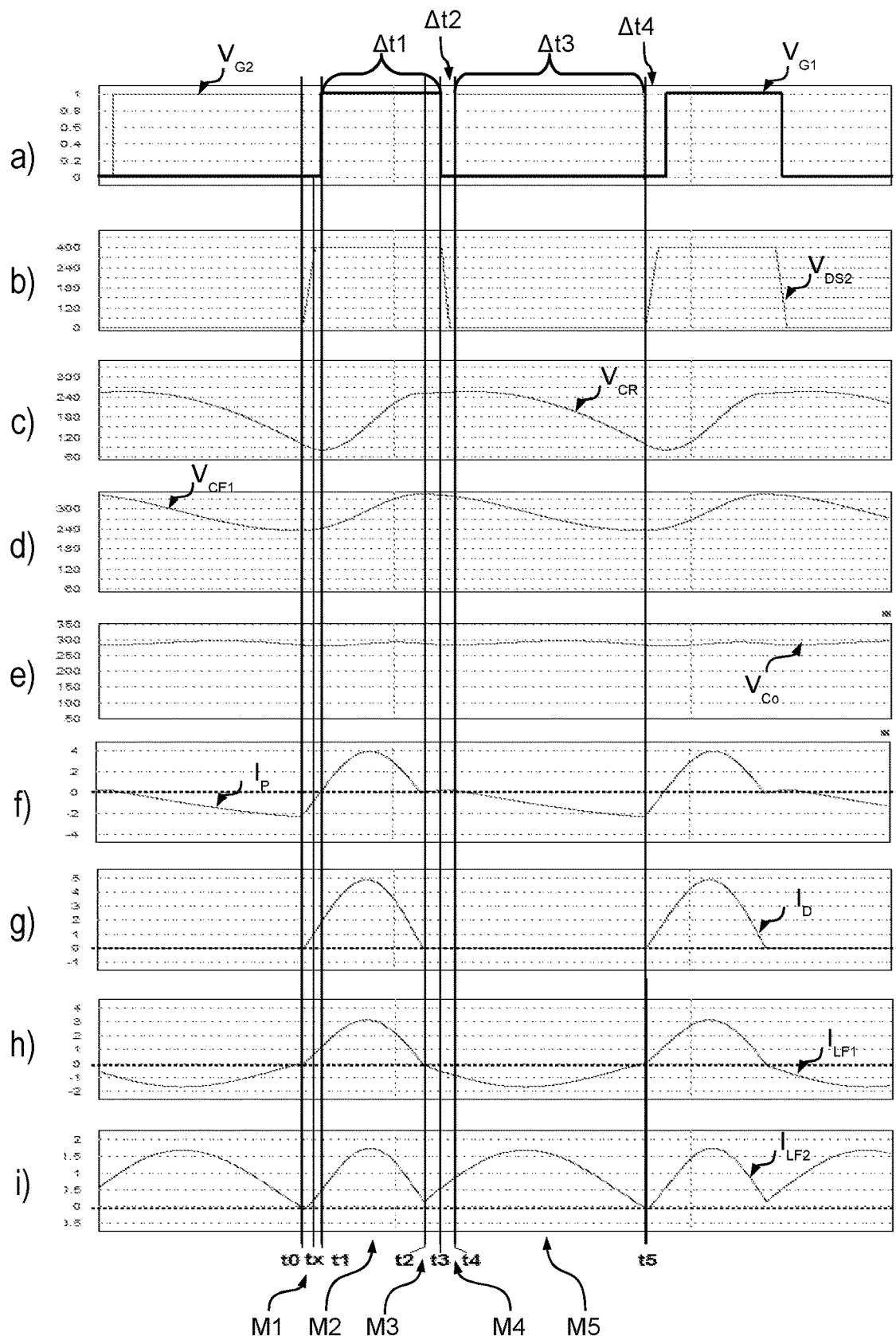
FIGS. 7 to 8g show details of an embodiment of the converter driving of FIG. 7.

In this regard, FIG. 7 shows the waveforms of some signals during these driving phases. Specifically, FIGS. 7a-7h respectively show:

a) driving signal $V_{G1}$ for switch $S_1$ and driving signal $V_{G2}$ for switch $S_2$, b) voltage $V_{DS2}$ at the intermediate point between switch $S_1$ and switch $S_2$, b) voltage $V_{CR}$ across capacitor $C_R$, c) voltage $VC_{F1}$ across capacitor $C_{F1}$, d) voltage $V_{Co}$ across capacitor $C_o$, corresponding to output voltage $V_o$, e) current $I_P$ flowing through primary winding T1 of transformer T, f) current $I_D$ flowing through diode D, g) current $I_{LF1}$ flowing through inductor $L_{F1}$, and h) current $I_{LF2}$ flowing through inductor $L_{F2}$.

At a time t0, switch $S_2$ is opened and switch $S_1$ stays opened.

In this operating phase (M1) diode D is forward biased, because the voltage across transformer T is reversed.

At the instant when switch $S_2$ is opened, current $I_P$ in the primary is negative. Such a current $I_P$ is used for charging capacitor $C_{A2}$ which was previously discharged, which may also be seen in FIG. 7b, because it increases voltage $V_{DS2}$. At a time tx, voltage $V_{DS2}$ at the intermediate point of the half-bridge reaches input voltage $V_{in}$ (e.g. 400V) and from this moment onwards diode $D_{A1}$ starts conducting; after this, switch $S_1$ may be closed, while the current flows through diode $D_{A1}$ and switching takes place at ZVS.

During this phase, therefore, a resonant circuit is established between the components on the primary side and the components on the secondary side.

Moreover, FIGS. 7d and 7e clearly show that at time t0, voltage $V_{Co}$ across capacitor $C_o$ is higher than voltage $V_{CF1}$ across capacitor $C_{F1}$.

Figure 8A:
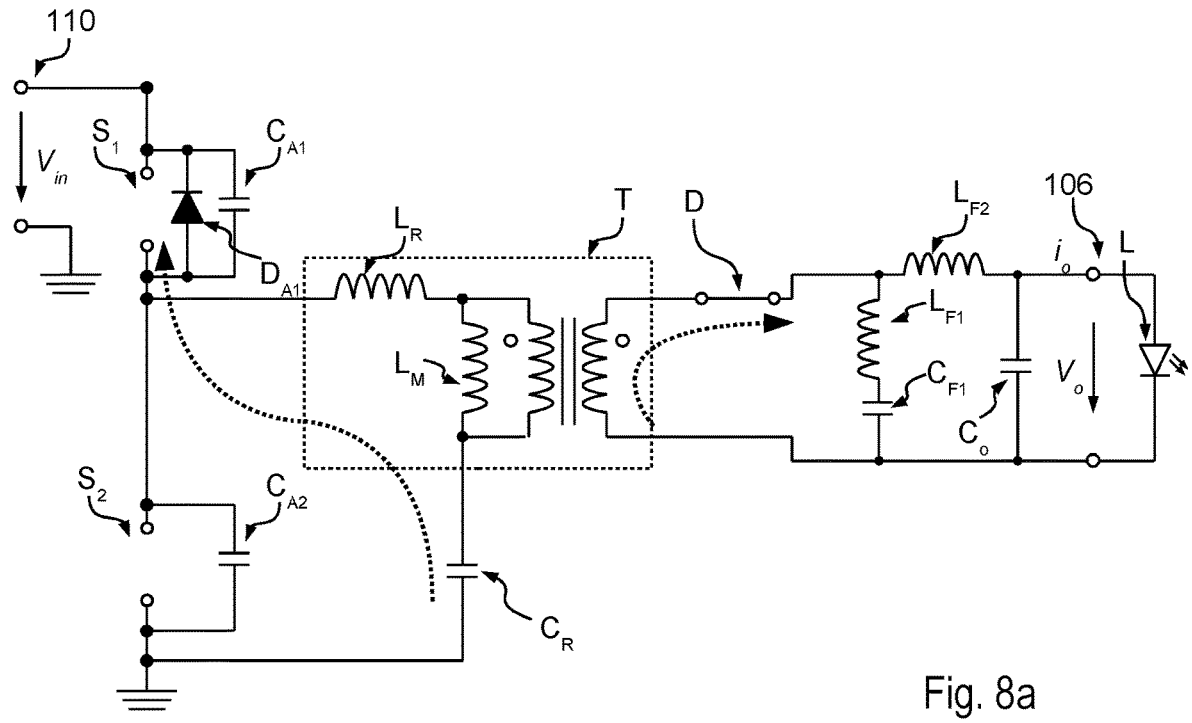
Figure 8B:
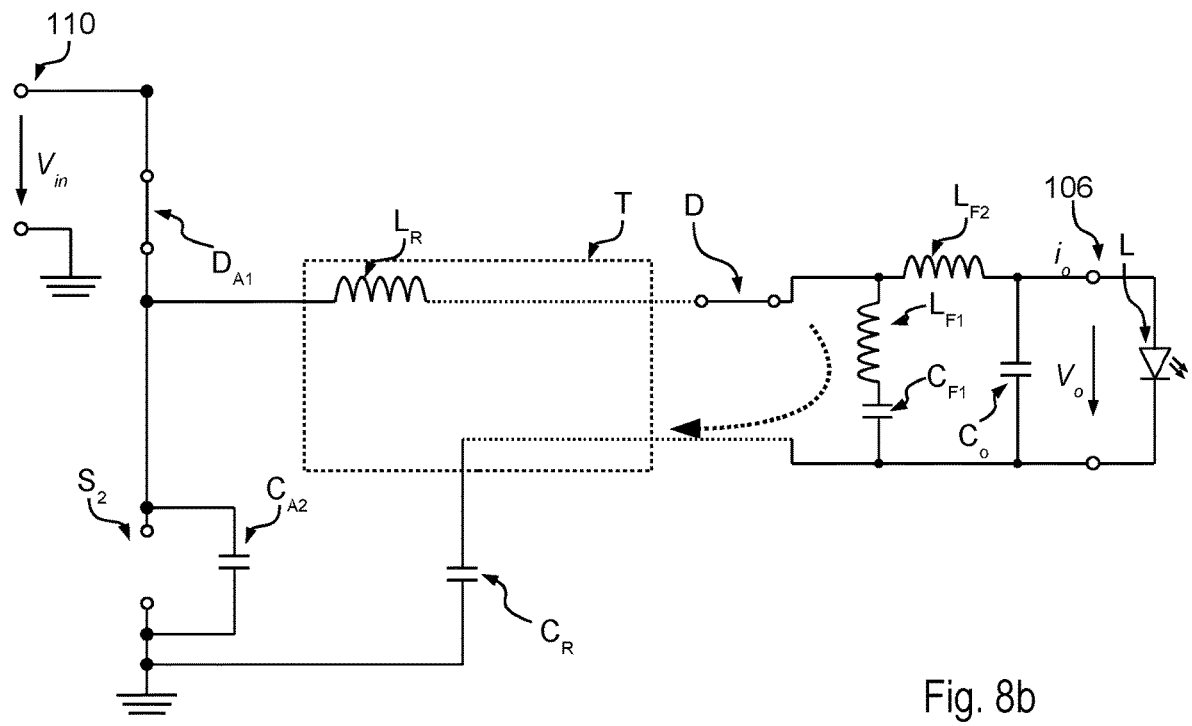

FIG. 8b shows the equivalent circuit diagram of the resonant components of the circuit during this phase.

In various embodiments, the inductance of inductor $L_{F2}$ is preferably equal to or higher than the inductance of inductor $L_{F1}$, i.e. $L_{F2} > L_{F1}$. Similarly, in various embodiments, the capacitance of capacitor $C_o$ is preferably equal to or higher than the capacitance of capacitor $C_{F1}$, i.e. $C_o > C_{F1}$.

As a consequence, considering the case $C_o > C_{F1}$ and $L_{F2} > L_{F1}$, therefore neglecting the resonance created by $C_o$ and $L_{F2}$ because the difference of voltages $V_{in} - VC_{F1} - V_{CR}$ is applied to the series connection of inductors $L_R$ and $L_{F1}$ and a resonant circuit is established comprising inductors $L_R$ and $L_{F1}$ and capacitors $C_R$ and $C_{F1}$, i.e. current $I_D$ flowing through diode D (corresponding to the sum of currents $I_{LF1}$ e $I_{LF1}$) starts oscillating with an oscillating period $T_{res1}$ which may be estimated as:

$$T_{res1} = 2 \cdot \pi \cdot \sqrt{(L_{R,PRI} + L_{F1}) \frac{(C_{R,PRI} \cdot C_{F1})}{(C_{R,PRI} + C_{F1})}} \quad (1)$$

wherein $L_{R,PRI}$ and $C_{R,PRI}$ represent leakage inductance $L_R$ and capacitance $C_R$ seen from the secondary side.

At a time t1 switch S1 is closed, wherein the switching of switch S1 preferably takes place at zero voltage.

Figure 8C:
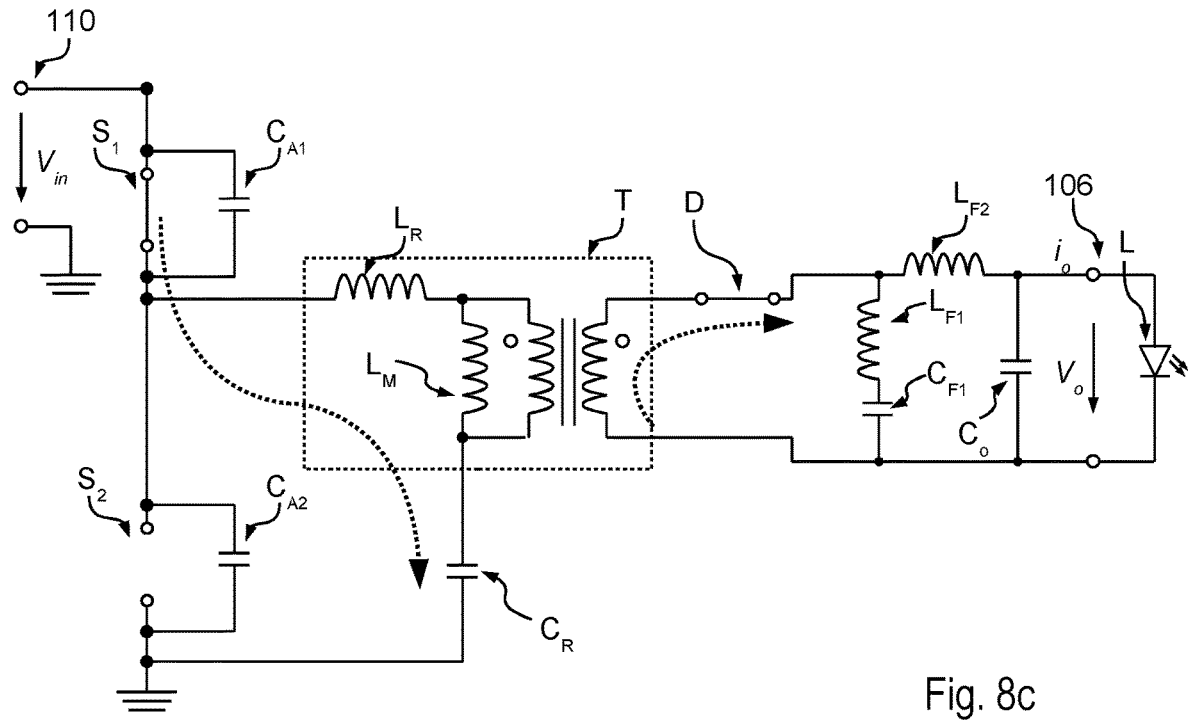

Therefore, as shown in FIG. 8c, during this phase (M2), current $I_P$ flowing through primary winding becomes positive, and current $I_D$ flowing through diode D keeps on oscillating with the oscillation period $T_{res1}$ shown in Equation (1), because the equivalent circuit diagram of the resonant components is the same as shown in FIG. 8b (the difference being that the circuit is closed via switch $S_1$ and not via diode $D_{A1}$)

At a time t2, current $I_D$ flowing through diode D falls to zero, because during this phase voltage $V_{CR}$ across capacitor $C_R$ increases, and voltage across primary winding T1 decreases.

Figure 8D:
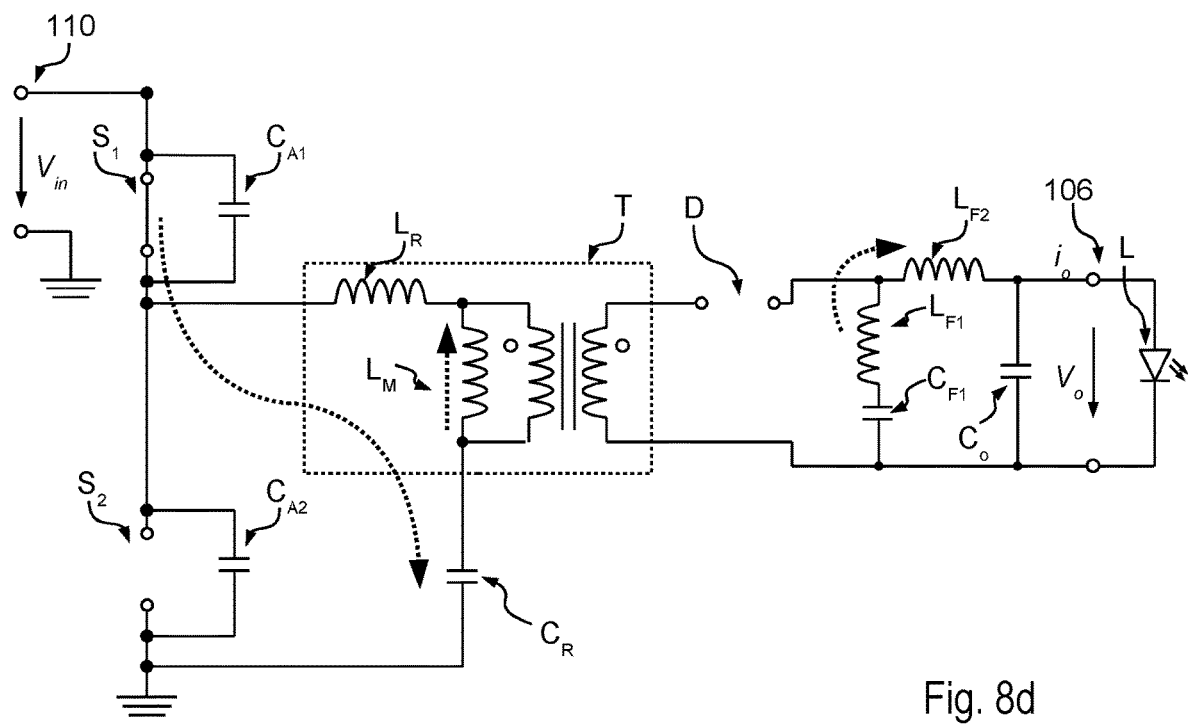

Therefore, as shown in FIG. 8d, during this phase (M3) diode D is open.

Figure 8E:
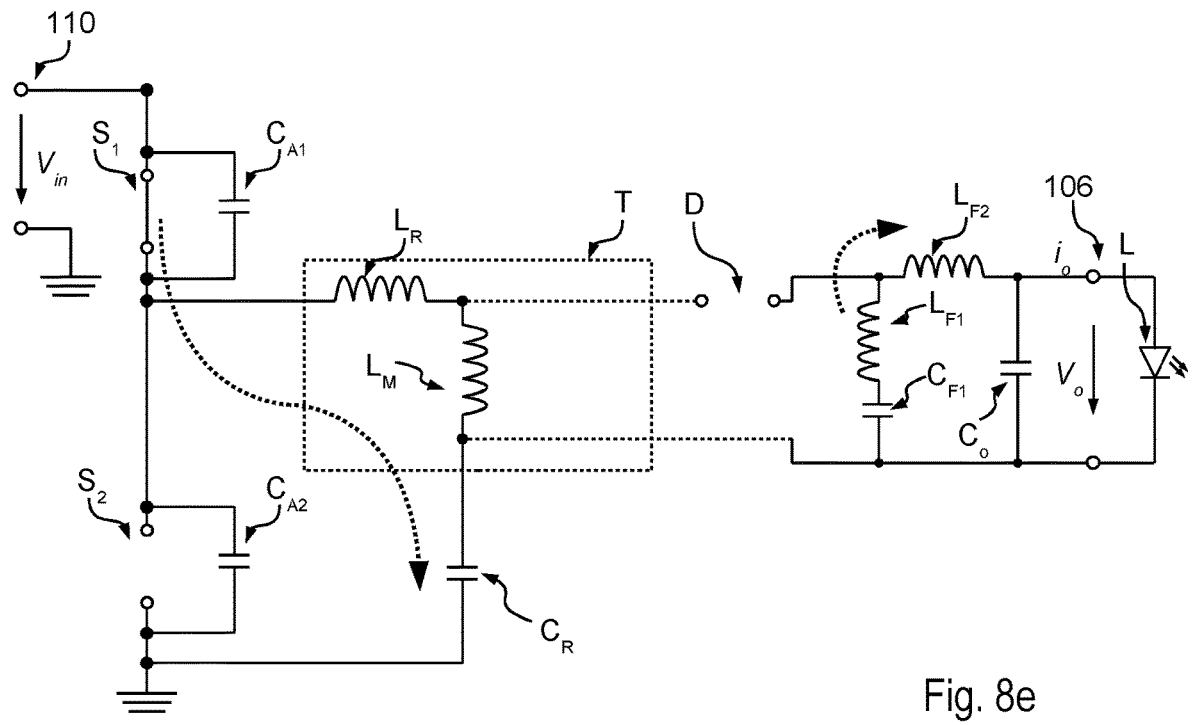

Consequently, at time t2 the circuit behaviour changes. As a matter of fact, from this moment onwards the converter comprises two independent circuits: the former on the primary side and the latter on the secondary side of transformer T. FIG. 8e shows the equivalent circuit diagram of the resonant components of the circuit during this phase.

On the primary side T1, voltage $V_{in}$ keeps on charging capacitor $C_R$ and now also magnetising inductance $L_M$, and therefore diode D stays opened. On the contrary, on the secondary side T2 a circuit is established comprising inductors $L_{F1}$ and $L_{F2}$ and capacitors $C_{F1}$ e $C_o$ connected in series.

Specifically, at time t2, the current flowing through inductor $L_{F1}$ corresponds to the current flowing through inductor $L_{F2}$, but with opposite sign ($I_{LF1}=-I_{LF2}$). Moreover, voltage $V_{CF1}$ at capacitor $C_{F1}$ will be higher than output voltage $V_o$. This voltage difference creates a current flow from capacitor $C_{F1}$ towards capacitor $C_o$, i.e. the current $I_{LF1}$ flowing through inductor $L_{F1}$ is negative and has the same amplitude as current $I_{LF2}$. Consequently, now current $I_{LF2}$ flowing through inductor $L_{F2}$ oscillates with an oscillation period $T_{res2}$ which may be estimated as:

$$T_{res1}=2\cdot\pi\cdot\sqrt{(L_{F1}+L_{F2})(C_{F1}+C_o)} \quad (2)$$

Figure 8F:
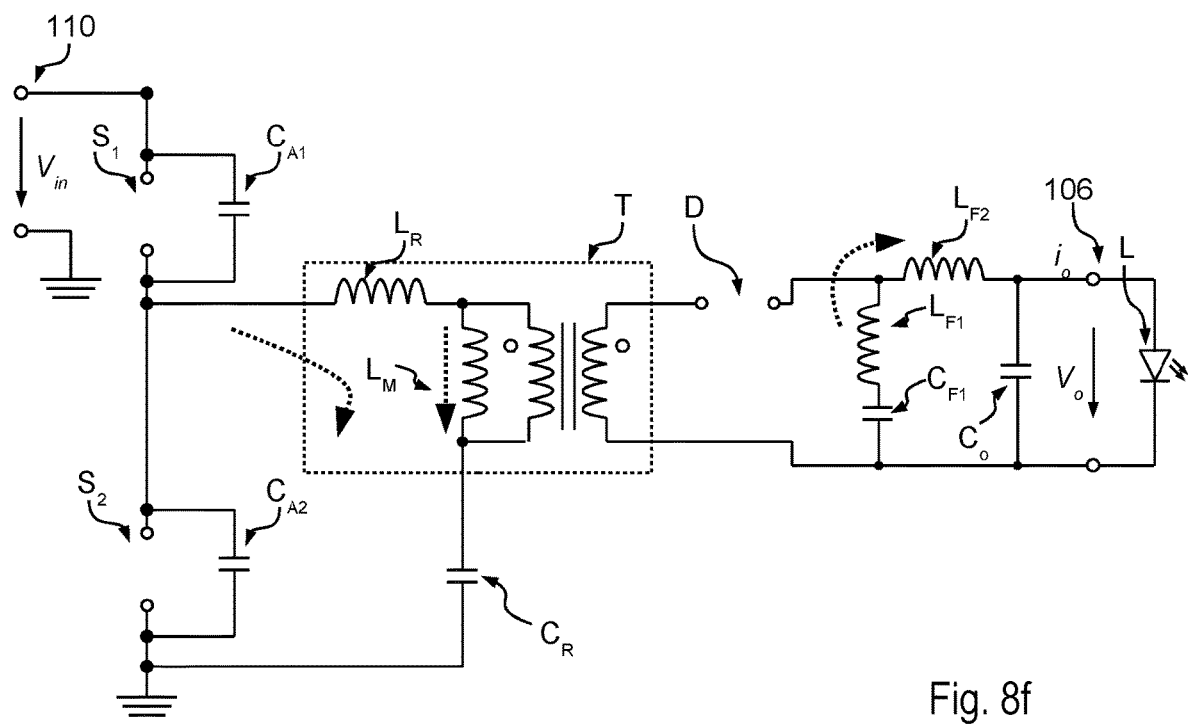

At a time t3, switch $S_1$ is opened while switch $S_1$ stays opened. Moreover, diodes $D_{A1}$, $D_{A2}$ and D are opened during this operating phase (M4). The corresponding equivalent circuit diagram of this driving phase is shown in FIG. 8f.

During this operating phase, current $I_P$ on the primary side of transformer T is positive, and discharges capacitance $C_{A2}$ and charges capacitance $C_{A1}$, preferably until the voltage across switch $S_2$ reaches zero.

During this phase, the voltage across winding T1 is negative, and therefore also diode D stays opened. Consequently, the oscillation on the secondary side continues, as shown in FIG. 8d, with period $T_{res2}$ according to Equation (2).

Figure 8G:
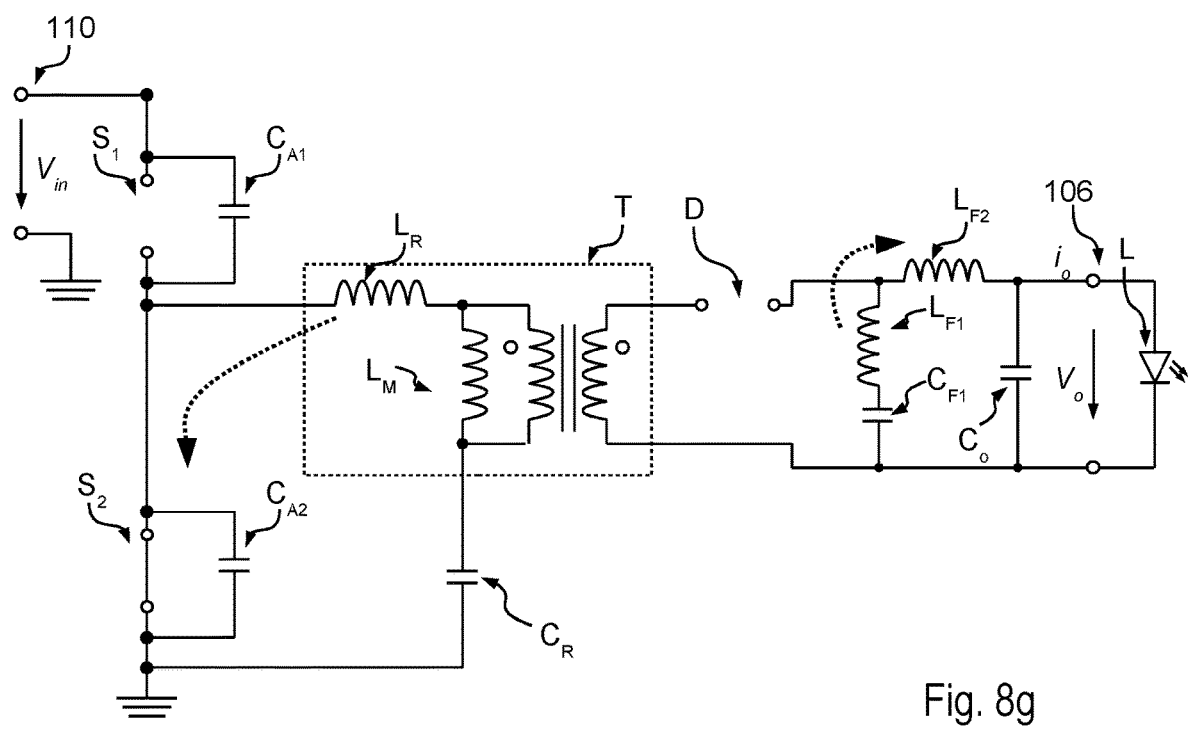

At a time t4, switch $S_2$ is closed and switch $S_1$ stays opened. Therefore, in this operating phase (M5) diodes $D_{A1}$, $D_{A2}$ are opened and diode D is opened, because voltage $V_{T1}$ across secondary winding T2 remains negative. The corresponding equivalent circuit diagram of this driving phase is shown in FIG. 8g.

Therefore, during this operating phase, capacitor $C_R$ is discharged, and the oscillation on the secondary side continues, as shown in FIG. 8d and according to Equation (2).

Subsequently, the method is repeated from time t5, which corresponds to time t0.

As a consequence, as shown in FIG. 7i, during phases M1 and M2 current $I_{LF2}$ flowing through inductor $L_{F2}$ is positive and oscillates with a period $T_{res1}$, and during phases M3, M4 and M5, current $I_{LF2}$ flowing through inductor $L_{F2}$ is positive, too, and oscillates with a period $T_{res2}$.

Figure 4A:
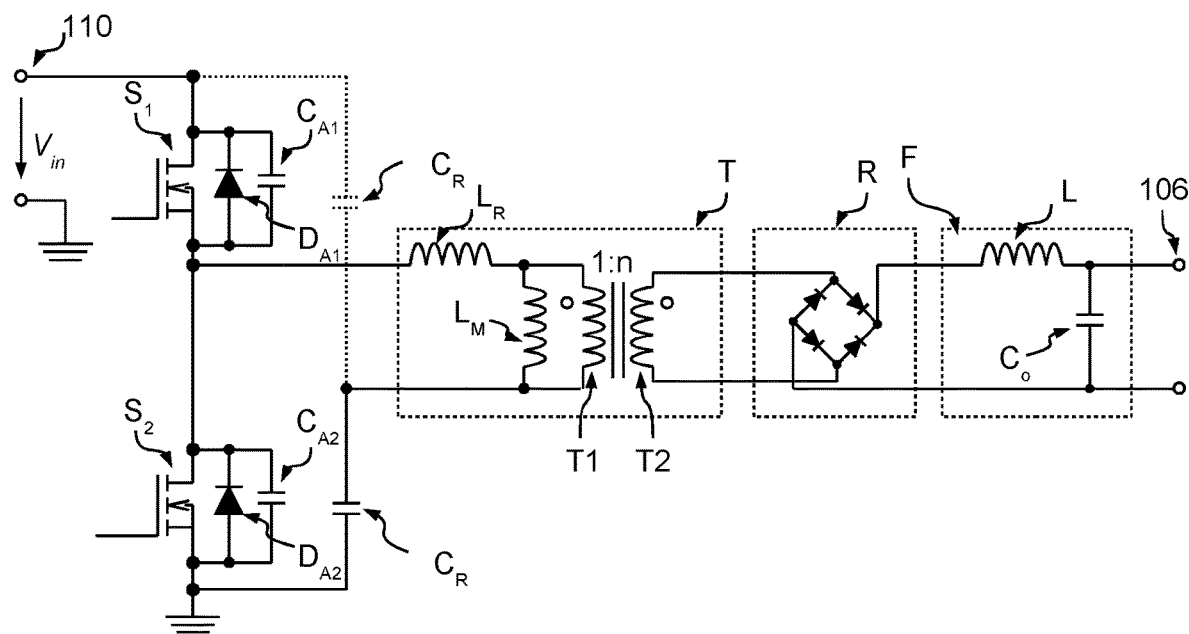
Figure 4B:
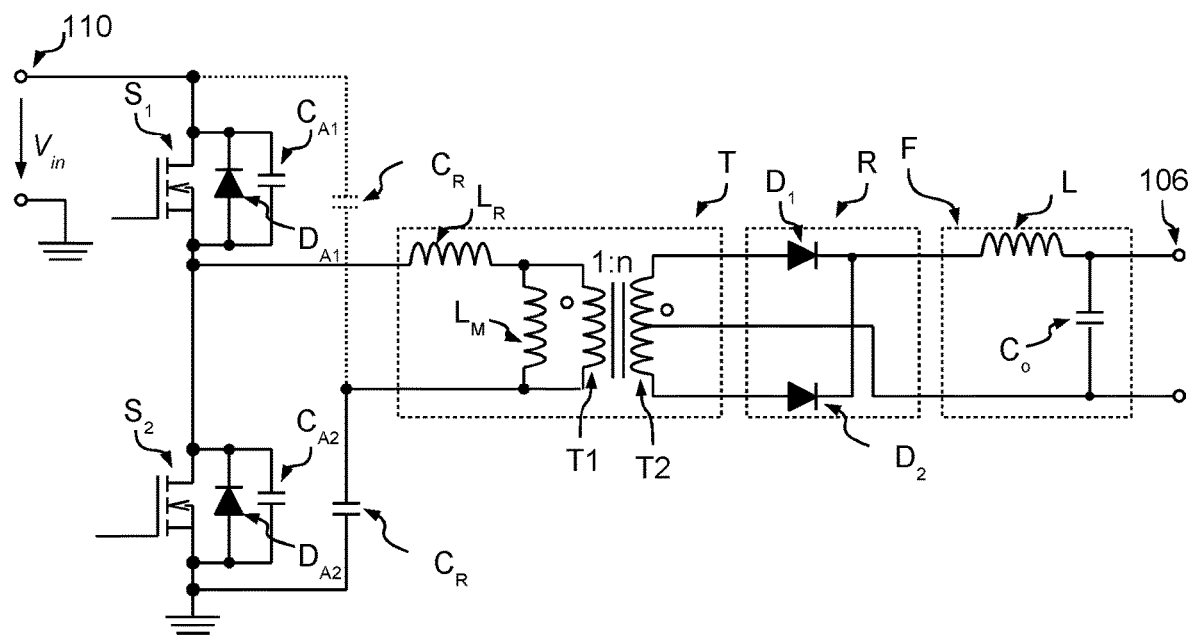
Figure 4C:
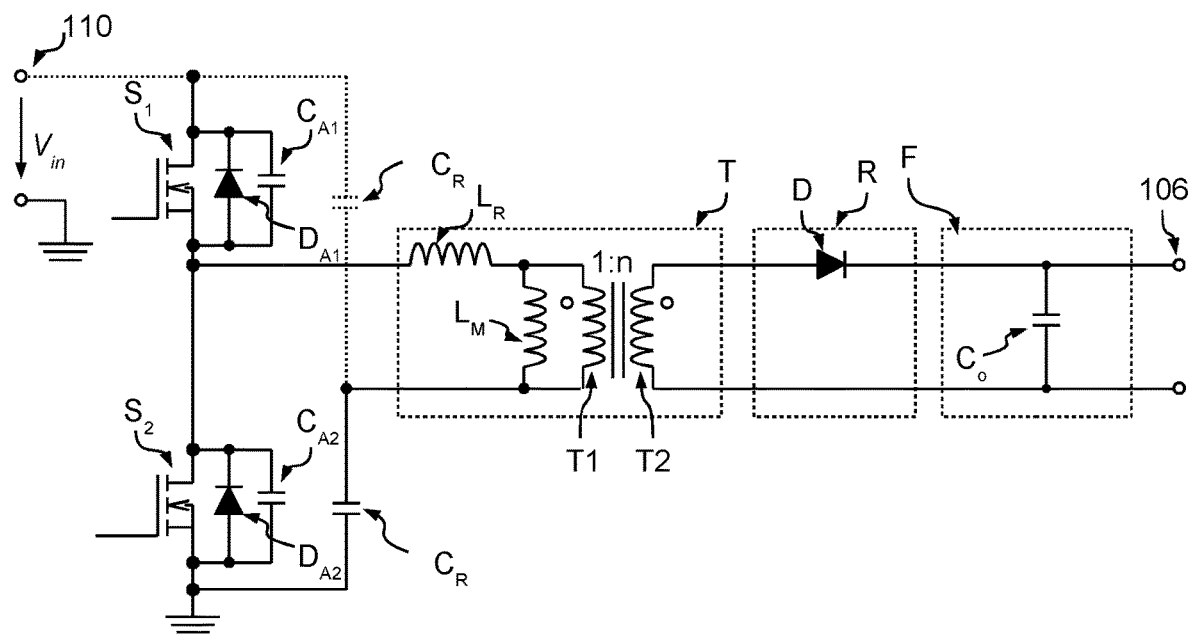
Figure 4D:
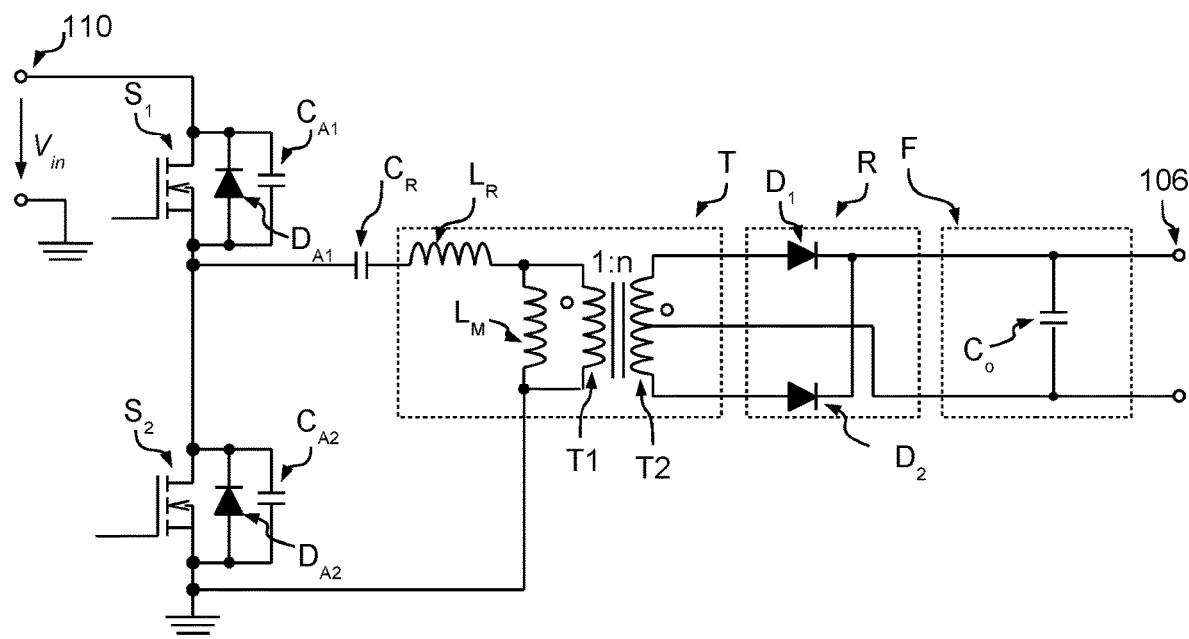

Therefore, in comparison with the traditional arrangement shown in FIG. 4C, filter Fa of the present description is adapted to provide a current $I_{LF2}$ also when diode D is open.

For example, for the converter shown in FIG. 6, the input voltage typically amounts to approximately 450 VDC (in Europe with a 230 VAC supply). The leakage inductance $L_R$ is typically in the uH range, e.g. 5 to 500 uH, and the magnetizing inductance $L_M$ is in the range of hundreds of uH, e.g. 100 uH to 5 mH, preferably 300 to 1000 uH. Finally, the capacitance of capacitors $C_R$ is in the nF range, e.g. 10 to 400 nF, preferably 30 to 100 nF.

In the traditional topology shown in FIG. 4c, the capacitance of output capacitor $C_o$ is typically in the uF range, and typically higher than 10 uF. Therefore, such a capacitor $C_o$ must be an electrolytic capacitor.

In this regard, the inventor has observed that the same RMS of a single output capacitor with 12 uF may be obtained through a filter Fa according to the present description having much lower values, e.g. with $C_{F1}=100$ nF, $L_{F1}=33$ uH, $L_{F2}=50$ uH and $C_o=1$ uF. Therefore, the solutions according to the present description allow for the use of film capacitors.

As previously mentioned, output capacitor $C_o$ connected in parallel with output 106 is purely optional and may be omitted, e.g. if the load is a LED module 20 comprising a LED chain.

In general terms, filter Fa according to the present description may be used with most converters. Generally, filter Fa is particularly advantageous for converters wherein the current provided by rectifier circuit R comprises periods during which such a current is zero.

For example, this may be applied to a half-bridge converter as shown in FIG. 4 or 4b, if such a converter is operated in Discontinuous-Conduction Mode (DCM).

For example, FIG. 9a shows an embodiment which is based on the circuit diagram of FIG. 4a, and wherein the filter Fa according to the present description is employed.

In this regard, FIGS. 9b to 9g show the waveforms of some signals for the converter of FIG. 9a:

b) driving signal $V_{G1}$ for switch $S_1$ and driving signal $V_{G2}$ for switch $S_2$, c) voltage $V_{DS2}$ at the intermediate point between switch S1 and switch S2, d) current $I_D$ which is provided by rectifier circuit R, e) current $I_{LF1}$ flowing through inductor $L_{F1}$, f) current $I_{LF2}$ flowing through inductor $L_{F2}$, and g) ripple $\Delta I_{Co2}$ of the current flowing through capacitor $C_o$.

Figure 10A:
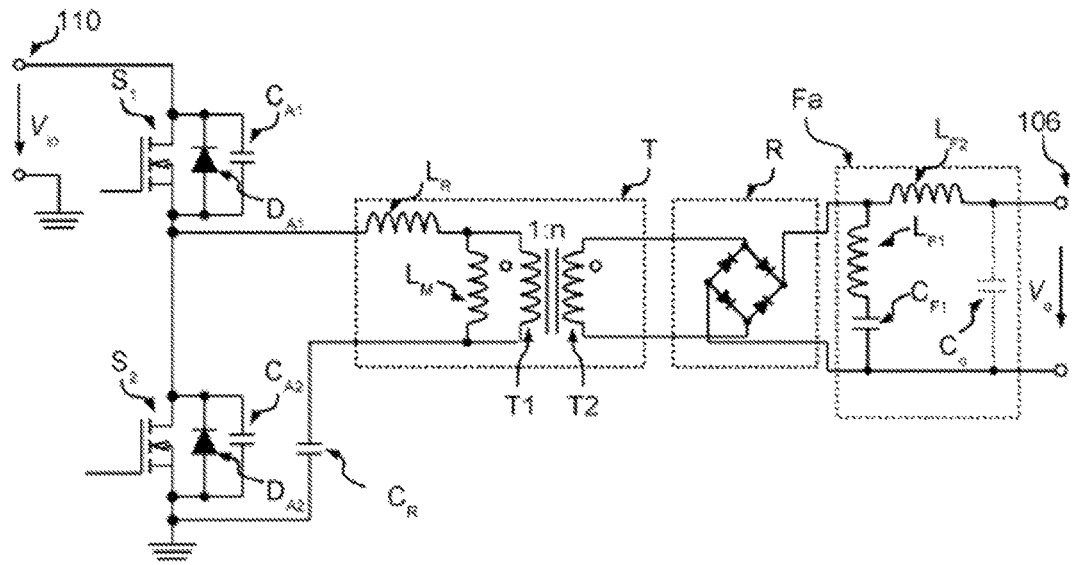
FIGS. 10a and 10g show a third embodiment of an electronic converter comprising the filter circuit according to the present description.
Figure 10B:
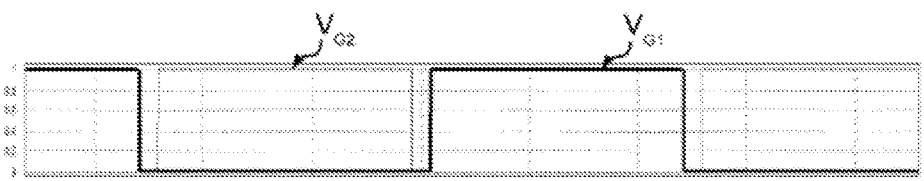
Figure 10C:
Figure 10D:
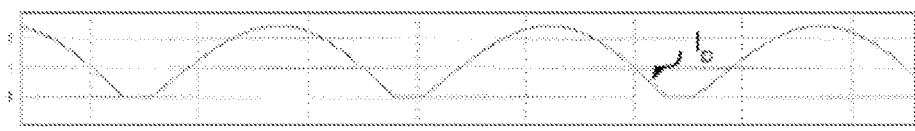
Figure 10E:
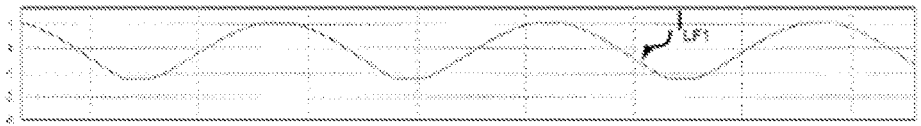
Figure 10F:
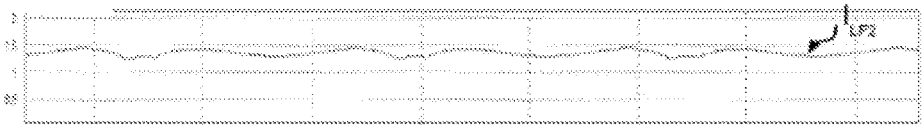
Figure 10G:
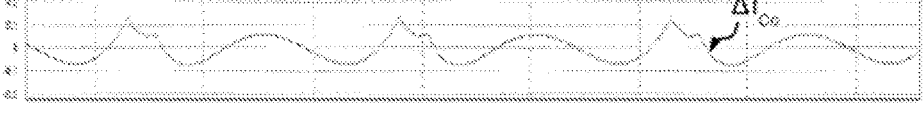

Finally, FIG. 10a shows that filter circuit Fa may also be used in resonant converters, e.g. an LLC resonant converter. Substantially, the circuit diagram corresponds to one of a conventional half-bridge converter, but the sizing of components change, specifically as regards transformer T (i.e. inductors $L_R$ e $L_M$) and capacitor $C_R$, and the type of driving which employs the circuit resonance.

In this regard, FIGS. 10b to 10g show the waveforms of some signals for the converter of FIG. 9a:

b) driving signal $V_{G1}$ for switch $S_1$ and driving signal $V_{G2}$ for switch $S_2$, c) voltage $V_{DS2}$ at the intermediate point between switch S1 and switch S2, d) current $I_D$ which is provided by rectifier circuit R, e) current $I_{LF1}$ flowing through inductor $L_{F1}$, f) current $I_{LF2}$ flowing through inductor $L_{F2}$, and g) ripple $\Delta I_{Co2}$ of the current flowing through capacitor $C_o$.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. An electronic half-bridge converter, comprising:
an input comprising two input nodes, wherein the input of the electronic half-bridge converter is configured to receive a first power signal;
an output comprising two output nodes, wherein the output of the electronic half-bridge converter is configured to provide a second power signal;
a transformer comprising a primary winding and a secondary winding;
a half-bridge comprising a first electronic switch and a second electronic switch, wherein the first electronic switch and the second electronic switch are connected in series, wherein the half-bridge is between the input of the electronic half-bridge converter and the primary winding of the transformer;
a rectifier circuit configured to convert current provided via the secondary winding into a rectified current; and
a filter circuit configured to provide the second power signal by filtering the rectified current provided by the rectifier circuit,
wherein the filter circuit comprises:
an input comprising a first input node and a second input node, wherein the input of the filter circuit is configured to receive the rectified current provided by the rectifier circuit;
a first branch connected between the first input node of the filter circuit and the second input node of the filter circuit, wherein the first branch comprises a first inductor and a first capacitor, wherein the first inductor of the first branch and the first capacitor of the first branch are connected in series; and
a second branch connected in parallel with the first branch, wherein the second branch comprises a second inductor, wherein the second inductor of the second branch and the output of the electronic half-bridge converter are connected in series,
wherein the first inductor of the first branch and the second inductor of the second branch share the first input node of the filter circuit,
wherein current provided by the rectifier circuit comprises at least one period during which the current provided by the rectifier circuit is zero, and
wherein, during the at least one period, current flowing through the first inductor of the first branch corresponds to current flowing through the second inductor of the second branch, but with an opposite polarity.

2. The electronic half-bridge converter of claim 1, wherein the filter circuit further comprises:
a second capacitor connected in parallel with the output of the electronic half-bridge converter.

3. The electronic half-bridge converter of claim 2, wherein the first capacitor of the first branch is connected to the rectifier circuit, and
wherein the second capacitor of the filter circuit is connected to the rectifier circuit.

4. The electronic half-bridge converter of claim 1, wherein the rectifier circuit comprises:
a diode connected in series with the secondary winding of the transformer, or
a bridge rectifier comprising:
two input nodes, wherein the two input nodes of the bridge rectifier are connected to the secondary winding, and
two output nodes, wherein the two output nodes of the bridge rectifier are connected to the filter circuit.

5. The electronic half-bridge converter of claim 1,
wherein the secondary winding comprises a first node, a second node, and an intermediate connection, and
wherein rectifier circuit comprises:
a first output node and a second output node, wherein the first output node of the rectifier circuit and the second output node of the rectifier circuit are connected to the filter circuit, wherein the intermediate connection of the secondary winding is connected to the second output node of the rectifier circuit;
a first diode connected between the first node of the secondary winding and the first output node of the rectifier circuit; and
a second diode connected between the second node of the secondary winding and the first output node of the rectifier circuit.

6. The electronic half-bridge converter of claim 1, further comprising:
at least one capacitor; and
an intermediate node between the first electronic switch and the second electronic switch,
wherein the two input nodes of the electronic half-bridge converter comprise a first input node and a second input node,
wherein the at least one capacitor and the primary winding are connected in series between the intermediate node and the first input node of the electronic half-bridge converter and/or the second input node of the electronic half-bridge converter.

7. The electronic half-bridge converter of claim 1, further comprising:
a control unit configured to:
detect a current through the output of the electronic half-bridge converter; and
drive the first electronic switch and the second electronic switch as a function of the detected current.

8. The electronic half-bridge converter of claim 7,
wherein at least one LED is connected to the output of the electronic half-bridge converter.

9. The electronic half-bridge converter of claim 1, further comprising:
a control unit configured to:
drive the first electronic switch and the second electronic switch, such that the first electronic switch is closed and the second electronic switch is opened during a first time interval.

10. The electronic half-bridge converter of claim 9,
wherein the control unit is further configured to drive the first electronic switch and the second electronic switch, such that the first electronic switch is opened and the second electronic switch is opened during a second time interval, and
wherein the second time interval follows the first time interval.

11. The electronic half-bridge converter of claim 10,
wherein the control unit is further configured to drive the first electronic switch and the second electronic switch, such that the first electronic switch is opened and the second electronic switch is closed during a third time interval; and
wherein the third time interval follows the second time interval.

12. The electronic half-bridge converter of claim 11,
wherein the control unit is further configured to drive the first electronic switch and the second electronic switch, such that the first switch is opened and the second switch is opened during a fourth time interval, and wherein the fourth time interval follows the third time interval.

13. The electronic half-bridge converter of claim 12, wherein the control unit is further configured to drive the first electronic switch and the second electronic switch, such that the first time interval, the second time interval, the third time interval, and the fourth time interval are periodically repeated.

14. The electronic half-bridge converter of claim 1, wherein the first inductor of the first branch and the first capacitor of the first branch are directly connected in series between the first input node of the filter circuit and the second input node of the filter circuit.

15. The electronic half-bridge converter of claim 1, wherein the second inductor of the second branch and the output of the electronic half-bridge converter are directly connected in series between the first input node of the filter circuit and the second input node of the filter circuit.

16. A method of an electronic half-bridge converter, the electronic half-bridge converter comprising:
   an input comprising two input nodes, wherein the input of the electronic half-bridge converter is configured to receive a first power signal;
   an output comprising two output nodes, wherein the output of the electronic half-bridge converter is configured to provide a second power signal;
   a transformer comprising a primary winding and a secondary winding;
   a half-bridge comprising a first electronic switch and a second electronic switch, wherein the first electronic switch and the second electronic switch are connected in series, wherein the half-bridge is between the input of the electronic half-bridge converter and the primary winding of the transformer;
   a rectifier circuit configured to convert current provided via the secondary winding into a rectified current; and
   a filter circuit configured to provide the second power signal by filtering the rectified current provided by the rectifier circuit;
   wherein the filter circuit comprises:
      an input comprising a first input node and a second input node, wherein the input of the filter circuit is configured to receive the rectified current provided by the rectifier circuit;
      a first branch connected between the first input node of the filter circuit and the second input node of the filter circuit, wherein the first branch comprises a first inductor and a first capacitor, wherein the first inductor of the first branch and the first capacitor of the first branch are connected in series; and
      a second branch connected in parallel with said first branch, wherein the second branch comprises a second inductor, wherein the second inductor of the second branch and the output of the electronic half-bridge converter are connected in series,
   wherein the first inductor of the first branch and the second inductor of the second branch share the first input node of the filter circuit;
the method comprising:
   driving the first electronic switch and the second electronic switch, such that current provided by the rectifier circuit comprises at least one period during which the current provided by the rectifier circuit is zero,
   wherein, during the at least one period, current flowing through the first inductor of the first branch corresponds to current flowing through the second inductor of the second branch, but with an opposite polarity.

17. The method of claim 16, further comprising:
   driving the first electronic switch and the second electronic switch, such that the first electronic switch is closed and the second electronic switch is opened during a first time interval; and
   driving the first electronic switch and the second electronic switch, such that the first electronic switch is opened and the second electronic switch is opened during a second time interval,
   wherein the second time interval follows the first time interval.

18. The method of claim 17, further comprising:
   driving the first electronic switch and the second electronic switch, such that the first electronic switch is opened and the second electronic switch is closed during a third time interval; and
   wherein the third time interval follows the second time interval.

19. The method of claim 18, further comprising:
   driving the first electronic switch and the second electronic switch, such that the first switch is opened and the second switch is opened during a fourth time interval, and
   wherein the fourth time interval follows the third time interval.

20. The method of claim 19, wherein the first electronic switch and the second electronic switch are driven, such that the first time interval, the second time interval, the third time interval, and the fourth time interval are periodically repeated.

* * * * *